March 7, 1939.   M. WEISMAN   2,149,410
DEMAND METER
Filed May 26, 1937   2 Sheets-Sheet 1

INVENTOR
*Morris Weisman*
BY
ATTORNEY

March 7, 1939.  M. WEISMAN  2,149,410
DEMAND METER
Filed May 26, 1937  2 Sheets-Sheet 2
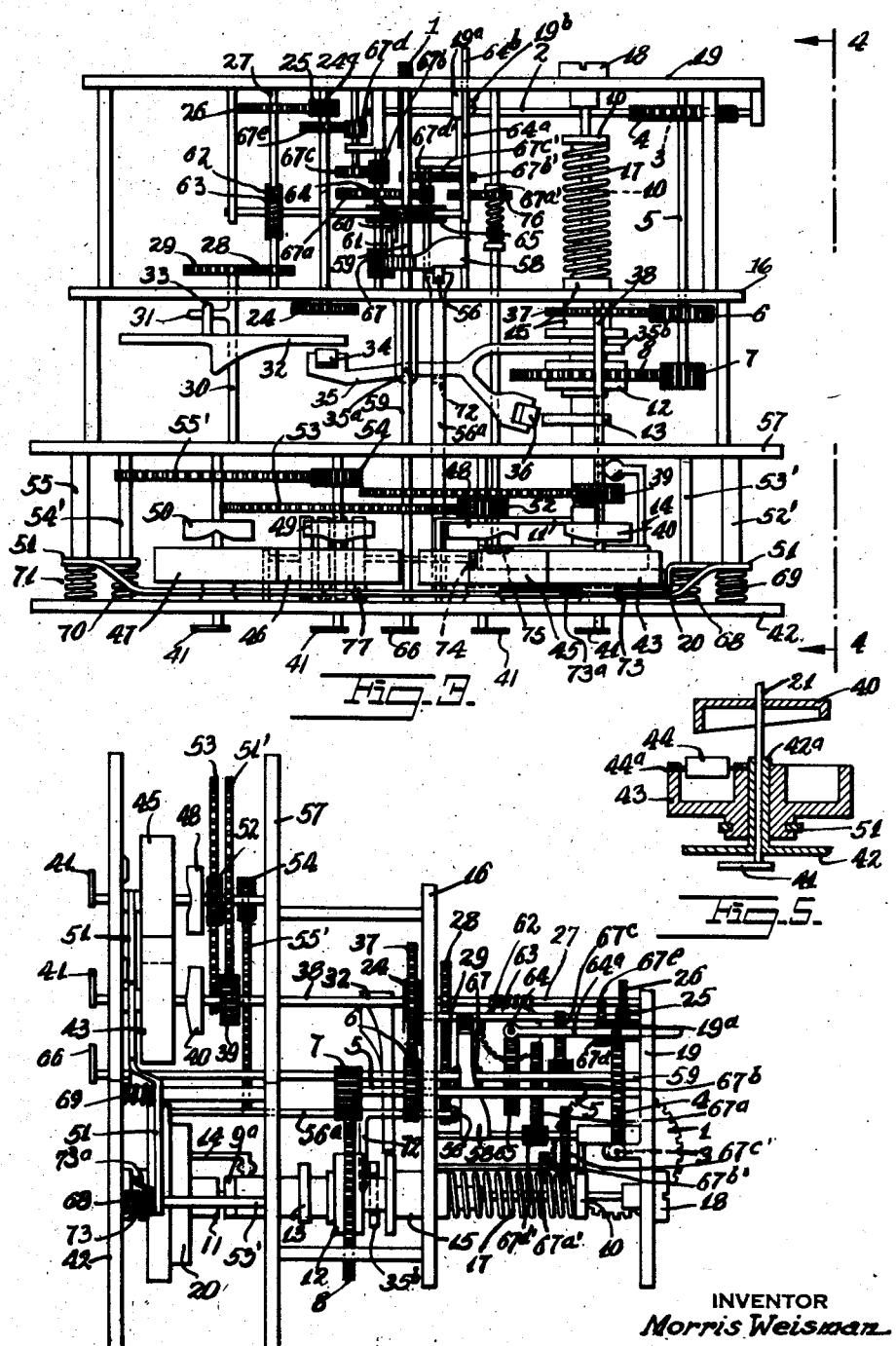
INVENTOR
Morris Weisman
BY
ATTORNEY Patented Mar. 7, 1939

2,149,410

UNITED STATES PATENT OFFICE 2,149,410

DEMAND METER

Morris Weisman, Brooklyn, N. Y.

Application May 26, 1937, Serial No. 144,823

12 Claims. (Cl. 171—34)

This invention relates to new and useful improvements in a demand meter.

This invention is chiefly concerned in devising a simple and completely automatic meter device that will eliminate the necessity of manually resetting the maximum demand indicator at the end of the reading or billing period (as in the present type of demand units) and at the same time to preserve the meter readings for the purpose of reading and checking up for at least the whole of the following billing period. All of the final readings are of accumulative character, thus, further preserving them for future check-up and record.

More specifically, the invention proposes a demand meter which is characterized by means for advancing a maximum demand dial operative prime driver consisting of a standard watthour meter or some form of relay unit, and including a dog adapted to be reset at will to its zero position without disturbing the advanced position of the demand dial, and providing means for resetting said dog to its zero position at the end of each demand interval. Furthermore, a timing unit is proposed for resetting the demand dial to its zero position at the end of each billing period, and the provision of means for adding the maximum demand reading on said demand dial to an accumulative cyclometer demand register operative simultaneously with the resetting of the demand dial.

Still further the invention proposes the addition of kilowatthour pointers adapted to be advanced by said standard watthour meter and associated with normally inoperative kilowatthour dials which in turn are rendered operative and are moved to positions corresponding with the positions of the pointers at the instant, and simultaneous with the resetting of the demand dial. This arrangement, the automatic periodic resetting of the maximum demand indicator, along with the periodic accumulation of the maximum demand readings and also the kilowatthour readings, gives to the utility companies something for which they have been striving (accumulative readings for preserving records, uniform billing periods, and the saving of meter readers' time by the elimination of the manual resetting device). It can be further pointed out that this meter device, with its accumulative and preserved readings, frees the utility companies of the necessity of arranging the reading periods with respect to dates (as at present) and allows the utility companies to read the meters at their convenience.

The maximum demand recording mechanism of this invention is an improvement over those on the market in that the unit throws very little load on the meter element at both the resetting and the advancing period.

An arrangement is also proposed for using eccentric elliptical gears in the interval timing unit for reducing the time necessary for the operation of the interval resetting mechanism to a minimum so that only an inappreciable error in demand reading is contended with.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a plan view of the meter with the external casing removed and illustrated with the various parts in their correct positions.

Fig. 4 is a side elevational view of Fig. 3 looking in the direction of the line 4—4 thereof.

Fig. 5 is a fragmentary enlarged horizontal sectional view showing the details of one of the kilowatthour pointers and dials.

Fig. 6 is a fragmentary detailed sectional view of a portion of the meter showing particularly the mechanism for operating the accumulative cyclometer demand register.

Figures 1, 2:
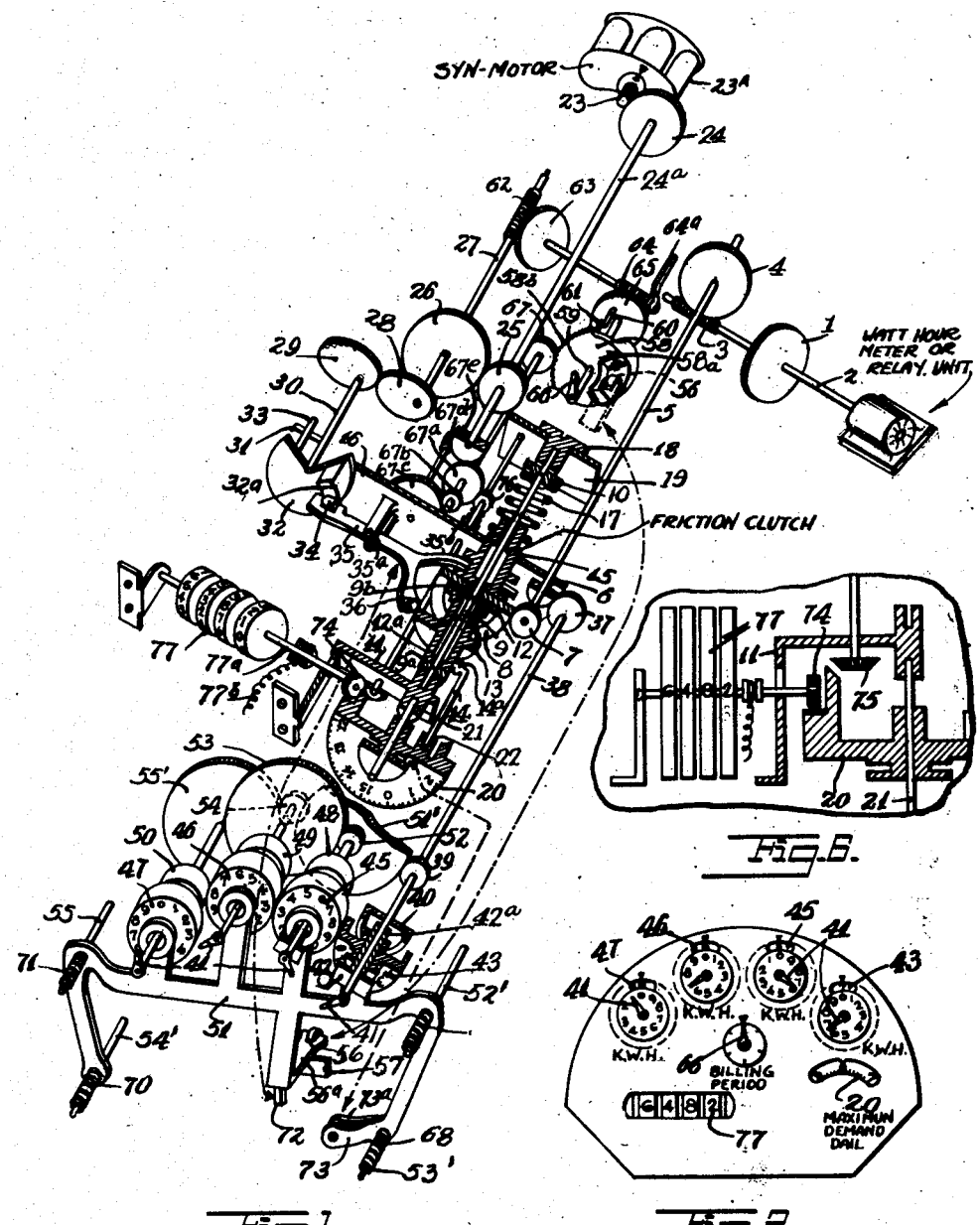
Fig. 1 is a perspective schematic view of a demand meter constructed according to this invention.
Fig. 2 is a front elevational view of the meter with the parts in their correct relations and position.

Generally speaking, the demand meter, according to this invention, includes a maximum demand dial 20 and means for advancing said dial, and said means being adapted to be operated by a prime driver consisting of a standard watthour meter or some form of relay unit driving the shaft 2, and including a dog 14 adapted to be reset at will to its zero position (hereinafter more fully described) without disturbing the advanced position of the demand dial 20.

The dog 14 is reset at the end of each demand period by a lever 35 which is operated by a time unit controlled by a synchronous motor 23ª. There is also an arrangement for resetting the demand dial 20 to its zero position at the end of each billing period (usually of a month's duration). An accumulative cyclometer demand register 77 is associated with the demand dial 20 and with means for adding the maximum demand reading on the demand dial to said cyclometer simultaneous with the resetting of the demand dial. Kilowatthour pointers 41 are adapted to be advanced by the said standard watthour meter which drives the shaft 2, and these pointers are associated with normally inoperative kilowatt-hour dials 43, 45, 46 and 47. A means is also provided for moving the kilowatthour dials to the positions of the pointers 41 simultaneous with the resetting of the demand dial 20 as hereinafter more fully explained.

Generally speaking, the demand meter operates as follows: The shaft 2 is driven by a gear 1 which is connected with or driven by either a standard watthour meter unit or some form of relay unit which in turn indirectly advances the dog 14 as hereinafter more fully explained, by a transmission system. At the end of the demand interval the dog 14 is reset to zero and the maximum demand dial 20 indicates the demand in the usual manner. This operation is repeated periodically for the length of the billing period (usually of a month's duration) at the end of which time dial 20 indicates the maximum demand for the aforesaid period. At different times the timing unit of the meter resets dial 20 to zero, simultaneously adding this maximum demand reading to the accumulative cyclometer demand register 77.

Simultaneous with this operation, kilowatt-hour dials 43, 45, 46 and 47 are caused to read the same reading as kilowatt-hour pointers 41 read at that instant. The reading on kilowatt-hour dials 43, 45, 46 and 47, and accumulative demand register 77 are then preserved throughout the whole of the next billing period for the benefit of the meter reader and anyone who wishes to check the meter readings. These operations are repeated at the end of every billing period including the accumulation of the respective readings on the accumulative demand register and on the accumulative kilowatthour dials.

The means for advancing said demand dial 20 which is adapted to be operated by a prime driver consisting of a standard watthour meter or some other form of relay unit includes the shaft 2 on which there is a worm 3 meshing with a worm wheel 4 which is driven in an anti-clockwise direction by the worm 3. The worm wheel 4 is mounted upon a shaft 5 provided with pinion gears 6 and 7. The pinion 7 drives a gear 8 which is loosely connected with a shaft 9. Shaft 9 is bearinged in end bearing 18 and in bracket 11. On the front end of shaft 9 is sleeve 12ª which is loosely mounted on the said shaft. The said sleeve 12ª is held in position on shaft 9 by collars 9ª and 9ᵇ. Sleeve 12ª contains clutch plate 12, cam 13 and dog 14. Loosely mounted on shaft 9 is also gear 8 which is situated next to clutch plate 12. On shaft 9 is clutch 15 along with spring 17 and collar 10. Clutch 15 is loosely mounted on shaft 9 and presses gear 8 against clutch plate 12 by the expansion of spring 17, the collar 10 acting as an abuttment for said spring 17. Demand dial 20 is loosely mounted on pin 21. An extension 22 on the dial 20 is directly in the path of the dog 14 and is advanced in proportion to the rotative power of gear 1.

The dog 14 is moved in a clockwise direction by the motive power of gear 1 through the gear train 3, 4, 7 and 8. It advances in proportion to the speed of the motive power at gear 1. At the end of the demand interval (usually of one half hour duration) the dog 14 is reset to the zero position, its original position on the top side of the bracket 11, by the action of the lever 35 acting in conjunction with clutch 15 and the cam 13. The dog 14 advances in proportion to the kilowatts registered by the motive power for the demand interval, that is, it turns proportionally through an angular distance. After that, it is reset and the procedure is again repeated. The movement of the dog 14 might be of different distances, for each demand interval. The maximum angular distance obtained during any one and all of these demand intervals during the billing period is registered on the demand dial 20 and is called the "maximum kilowatt demand". The dog 14 can only be turned approximately 330° around the axis of the shaft 9. The width of the bracket 11 makes up the other 30°.

The timing unit for resetting the demand dial 20 is driven by the synchonous motor 23A of the type used on demand meters now on the market. This motor has an external gear with an overrunning clutch which is used for the purpose of checking the mechanism. Although this motor is recommended, any other type of synchronous motor, suitable for the purpose, may be used. The timing motor 23A drives shaft 27 at a constant speed through gear train consisting of gears 23, 24, 25 and 26. Shaft 27 drives eccentric elliptical gears 28 and 29, which in turn drive shaft 30 and pin 31 projecting radially from the shaft. A cam 32 is loosely mounted on the shaft 30. A pin 33 extends axially eccentrically from the cam 32 and is seated in the path of the pin 31.

When the pin 31 is revolved in a clockwise direction it carries along the cam 32, the two making one revolution for each demand interval. A V-shaped section 32ª is formed on the cam 32 and contacts a roller 34 on the lever 35 once every demand interval and causes the lever to pivot rather quickly about a pintle 35ª because of the eccentric elliptical gears 28 and 29, and then to drop down the other side of the V-shaped section. This sudden forward movement and then backward movement causes the lever 35 to pivot and open the clutch 15. The lever 35 has a portion 35ᵇ which engages in a peripheral groove in the clutch 15 for connecting these parts. The pivoting of the lever 35 causes a roller 36 which is carried by another portion of the lever 35 to press against the cam 13, thus bringing cam 13 and dog 14 back to their original position, that is, with the dog 14 reset on the top edge of the bracket 11, its zero position.

The dog 14 is driven forward (turned) and covers a distance in proportion to the speed of the motive power of gear 1. The dog 14 is reset at the end of each demand interval. Since demand dial 20 is in the path of the dog 14 it will advance to the maximum position which the dog attained in any one interval.

The kilowatthour pointers 41 are advanced by the standard watthour meter as follows: On shaft 5 there is the gear 6 which meshes with and drives gear 37 on a shaft 38. Shaft 38 also carries a gear 39, a cam 40 and one of the pointers 41. The front end of the shaft 38 is bearinged in a sleeve 42ª attached to an end plate 42. On the said sleeve 42ª is the dial 43 which carries a small roller 44 (see Fig. 5).

The kilowatthour pointer 41 on the shaft 38 is revolved by the motive power at the gear 1 and is caused to indicate the kilowatthours registered by the said motive power or meter. Cam 40 is solidly connected to the shaft 38 and is revolved at the same rate as pointer 41. Cam 40 is heartshaped upon its front face b (see Fig. 5). The dial 43 is slidably mounted on the sleeve 42ª. The roller 44 is placed as shown in Fig. 5. It is attached to the dial 43 by a pin 44ª which passes from the outside portion of the dial through the roller 44 and to the inner sleeve portion of the dial 43. An extension of a framework 51 circles the front portion of the dial 43 engaging in a groove thereof to be capable of moving the dial 43. It is so attached to the dial that the said dial is moved backward and forward with the framework.

The framework 51 and cam 43 are normally against the plate 42 out of the path of the cam 40. When the framework 51 moves dial 43 backwards the roller 44 on the dial 43 contacts the surface b on the cam 40 and rolls around on this surface until the roller 44 falls into the lowest part of the cam 40. At this time the reading on the dial 43, as seen through an opening in the plate 43, corresponds to the reading of the pointer 41 or its dial on the face of the plate 42. A fraction of a minute later the framework 51 and the dial 43 is moved forward to normal position and out of the path of the cam 40. This action takes place in a very short time at the end of the billing period. Now dial 43 preserves this reading until the next reading date comes along (the end of the billing period). In the meantime pointer 41 continues to accumulate the kilowatt-hours registered by the motive power (the watt-hour meter). The dials 45, 46 and 47 are constructed similarly to the dial 43, and cams 48, 49 and 50 are constructed similar to the cam 40. Gears 51', 52, 53, 54 and 55' are similar to the register gears of a standard register and drive corresponding dial pointers 41 in a similar manner.

The framework 51 slides on posts 52', 53', 54' and 55 which are all located between the end plate 42 and an end plate 57. An extension arm 56ª to the framework 51 supports a roller 56. This roller extends through a guide hole in the said plate 57 and rides on a cam 58. The cam 58 is loosely connected with a shaft 59 and is driven by contact of a pin 60 and 61 through a gear train, starting the shaft 27 and continuing through gears 62, 63, 64 and 65. Gear 65 and so the pin 60 make one revolution for each billing period (probably of a month's duration). Pointer 66 indicates the extent of the billing period.

Cam 58 is driven by pin 60 until roller 56 comes to the edge 58ª on cam 58 and rolls down the incline into the depression in said cam 58, thus advancing cam 58 and causing toothed section 58ᵇ on cam 58 to contact fast-moving gear 67. Fast moving gear 67 is driven through a train of gears 67ᵇ, 67ᶜ, 67ᵈ and 67ᵉ. The gear 67ᵉ is mounted on shaft 24ª, which is provided with gear 24 meshing with the gear 23 receiving rotations from the motor 23ª.

Roller 56 rides on the face of the cam 58 and rides in the depression on the face of the cam as the said cam is moved in a counter-clockwise direction by gear 67. During the whole length of the toothed section on cam 58 roller 56 is driven into the depression on the cam 58 as explained above, and then is driven out again. This forward and backward motion is caused by springs 68, 69, 70 and 71 which drives framework 51 backwards, thus making dials 43, 45, 46 and 47 to contact cams 40, 48, 49 and 50, and cause them to revolve to a position where each dial reads the same reading as its corresponding dial pointer 41.

Also, an extension 72 from the framework 51 contacts the lever 34 thus causing a resetting operation of the dog 14. Besides these two operations an extension arm 73 of the framework 51 causes demand dial 20 to move backwards and first engage a gear 74 and then a gear 75 (which is driven by motor 23A through a gear train at a comparatively fast speed through friction clutch 76. In schematic Fig. 1 the friction clutch 76 is shown driven by gear 67ª which receives rotations from gears 67ᵇ and 67ᶜ, but this is merely a schematic illustration. The full arrangement is shown in Figs. 3 and 4, where a train of four gears 67ᵈ', 67ᶜ', 67ᵇ', and 67ª' connect gear 67ª with clutch 76). When framework 51 moves backwards on the reading period, extension 73 causes the dial 20 also to move backwards, first engaging the toothed surface (see Fig. 6) with gear 74 and then toothed surface with gear 75. Gear 75 is a fast moving gear and is connected to the timing motor through the clutch arrangement 76. Now gear 75 drives dial 20 in a counter-clockwise direction until extension 22 of dial 20 lays on top of the dog 14 which was reset to zero as previously explained. Now dial 20 is at zero, at the same time gear 74 drives cyclometer register 77 and adds its reading to that which was cn the dial 20. After this operation is completed, clutch 76 slips until framework 51 goes forward again and disengages, first gear 75 and then gear 74. Then demand dial 20 is ready for the next interval and cyclometer 77 preserves the accumulated demand reading. In this position the spring leaf 73ª of extension 73 on framework 51, expands and holds demand dial 20 in case of vibration or any other external force causing an abnormal movement of dial 20.

Now everything is in normal position for the next reading period and dial pointers 41 are allowed to accumulate the reading and demand dial 20 the maximum demand for the next billing period. In the meantime dials 43, 45, 46 and 47 and cyclometer register 77 indicate and preserve the accumulative readings of both the kilowatt-hours and the maximum demand that were recorded for the whole of the billing period.

The worm 64 is supported by a lever 64ª which has a projecting end 64ᵇ by which it may be moved and by which the worm 64 may be disengaged from the gear 65 so that the pointer 66 may be set for the correct reading date of the meter. An extension 19ª of end plate 19, and screw 19ᵇ fastens lever 64ª to the said extension. Screw 19ᵇ is first loosened and then lever 64ª is pivoted around screw 19ᵇ so that worm 64 and gear 65 may be disengaged. The accumulating cyclometer 77 has a shaft 77ª which is drawn in one direction by a spring 77ᵇ to aid in engaging gear 74 with the geared surface of the demand dial 20.

The dog 14 has a weight 14ª which is for the purpose of counter-balancing the depression or cutaway portion of the cam 13 so that this should not tend to rotate of its own accord or exert any turning force in any direction.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a maximum demand meter, a demand dial, a prime driving means, means for advancing said dial and adapted to be operated by said prime driving means and including a dog adapted to be reset at will to its zero position, means for resetting said dog to its zero position at the end of each demand interval, a timing unit for resetting the demand dial to its zero position at the end of each billing period, an accumulative cyclometer demand register, and means for adding the maximum demand reading on said demand dial to said cyclometer simultaneously with the resetting of the demand dial, said means for advancing said dog comprising a gear train operated by said prime driving means and including a shaft with a clutch supporting a cam and supporting said dog, and means for opening said clutch and simultaneously operating said cam for turning said shaft to reset the dog to its zero position and including a lever connected with the clutch and provided with a roller cooperative with said cam, and means for quickly pivoting the lever for the resetting, said means for quickly pivoting the lever including a gear train geared to a synchronous motor and including eccentric elliptical gears for obtaining the quick motion.

2. In a maximum demand meter, a demand dial, a prime driving means, means for advancing said dial and adapted to be operated by said prime driving means, and including a dog adapted to be reset at will to its zero position, means for resetting said dog to its zero position at the end of each demand interval, a timing unit for resetting the demand dial to its zero position at the end of each billing period, an accumulative cyclometer demand register, and means for adding the maximum demand reading on said demand dial to said cyclometer simultaneously with the resetting of the demand dial, said time unit for resetting the demand dial comprising a synchronous motor, a gear train connected therewith and driving a relatively rapid rotating shaft, a cam with a segmental gear portion engageable with a gear on said shaft, a frame slidably and resiliently mounted and including a portion with a roller engaging said cam, a clutch associated with said rapid shaft, and driving surfaces on said demand dial engaging driving gears of said accumulative cycylometer when said demand dial is moved rearwards, and an arm from said frame engaging said demand dial for moving the same rearwards when said frame moves rearwards.

3. In a maximum demand meter, a demand dial, a prime driving means, means for advancing said dial and adapted to be operated by said prime driving means and including a dog adapted to be reset at will to its zero position, means for resetting said dog to its zero position at the end of each demand interval, a timing unit for resetting the demand dial to its zero position at the end of each billing period, an accumulative cyclometer demand register, and means for adding the maximum demand reading on said demand dial to said cyclometer simultaneously with the resetting of the demand dial, said time unit for resetting the demand dial comprising a synchronous motor, a gear train connected therewith and driving a relatively rapid rotating shaft, a cam with a segmental gear portion engageable with a gear on said shaft, a frame slidably and resiliently mounted and including a portion with a roller engaging said cam, a clutch associated with said rapid shaft, and driving surfaces on said demand dial engaging driving gears of said accumulative cyclometer when said demand dial is moved rearwards, and an arm from said frame engaging said demand dial for moving the same rearwards when said frame moves rerwards, kilowatthour pointers adapted to be advanced by said prime driving means, normally inoperative kilowatthour dials for said pointers, and means for moving said kilowatthour dials to the position of said pointers simultaneously with the resetting of said demand dial, said latter means including rollers on said kilowatthour dials cooperative with cams fixedly connected with said kilowatthour pointers and operative during the period that said frame moves rearwards.

4. In a maximum demand meter, a demand dial movably mounted, means for rotating said demand dial from its normal position, a prime driving means and transmission mechanism for advancing said means and including a clutch, means for simultaneously rendering said clutch inoperative and resetting said first-mentioned means independently of said dial, an accumulative cyclometer demand register, and means for resetting said demand dial and simultaneously adding said maximum demand to the accumulated amount on said demand register.

5. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, a projecting portion on said demand dial extending into the path of rotation of said dog so that when said dog is turned in one direction it will bear against said portion to rotate said dial and when it rotates in the other direction, it will move away from said projecting portion back to its normal position while said demand dial remains unchanged.

6. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, a projecting portion on said demand dial extending into the path of rotation of said dog so that when said dog is turned in one direction it will bear against said portion to rotate said dial and when it rotates in the other direction it will move away from said projecting portion back to its normal position while said demand dial remains unchanged, said means for rotating said dog, comprising a prime driving means and transmission mechanism including a clutch, consisting of separate clutch members for transmitting the rotations of said transmission mechanism, and a drive for one of said clutch members and being connected with said transmission mechanism, said dog being mounted on the other of said clutch members so that as said drive rotates said clutch members, said dog will rotate therewith to bear against said projecting member to correspondingly rotate said dial to register the maximum demand.

7. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, a projecting portion on said demand dial extending into the path of rotation of said dog so that when said dog is turned in one direction it will bear against said portion to rotate said dial and when it rotates in the other direction, it will move away from said projecting portion back to its normal position while said demand dial remains unchanged, said means for rotating said dog, comprising a prime driving means and transmission mechanism including a clutch, consisting of separate clutch members for transmitting the rotations of said transmission mechanism, and a drive for one of said clutch members and being connected with said transmission mechanism, said dog being mounted on the other of said clutch members so that as said drive rotates said clutch members, said dog will rotate therewith to bear against said projecting member to correspondingly rotate said dial to register the maximum demand, said drive, comprising a gear meshing with a gear of said transmission mechanism.

8. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, a projecting portion on said demand dial extending into the path of rotation of said dog so that when said dog is turned in one direction it will bear against said portion to rotate said dial and when it rotates in the other direction, it will move away from said projecting portion back to its normal position while said demand dial remains unchanged, said means for rotating said dog, comprising a prime driving means and transmission mechanism including a clutch, consisting of separate clutch members for transmitting the rotations of said transmission mechanism, and a drive for one of said clutch members and being connected with said transmission mechanism, said dog being mounted on the other of said clutch members so that as said drive rotates said clutch members, said dog will rotate therewith to bear against said projecting member to correspondingly rotate said dial to register the maximum demand, said second-mentioned means, comprising a cam on the clutch member which supports said dog, a synchronous motor, and means controlled by said motor for urging said clutch members apart and simultaneously bear against said cam to move the clutch member supporting said dog so that said dog will be in its normal position.

9. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, said latter-mentioned means comprising a synchronous motor, a transmission mechanism connected to said motor and including a gear adapted to mesh with teeth on said demand dial and said gear and said teeth being normally out of mesh, and means for moving said demand dial so that the teeth thereon will mesh with the gear of said transmission system to move said dial back to its normal position.

10. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, said latter-mentioned means comprising a synchronous motor, a transmission mechanism connected to said motor and including a gear adapted to mesh with teeth on said demand dial and said gear and said teeth being normally out of mesh, and means for moving said demand dial so that the teeth thereon will mesh with the gear of said transmission system to move said dial back to its normal position, an accumulative cyclometer demand register, and means for adding the amount of maximum demand on said demand dial to the accumulated amount of maximum demand on said demand register simultaneous with the rotating of said demand dial back to its normal position.

11. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, said latter-mentioned means, comprising a synchronous motor, a transmission mechanism connected to said motor and including a gear adapted to mesh with teeth on said demand dial and said gear and said teeth being normally out of mesh, and means for moving said demand dial so that the teeth thereon will mesh with the gear of said transmission system to move said dial back to its normal position, comprising a gear having a cam surface with a low area and meshing with a gear of said transmission mechanism so as to rotate therewith, a slidably mounted frame including a portion with a roller engaging said cam and a portion engaging said demand dial, and means urging said frame against said gear so that when said roller reaches said low area said means will have moved said frame which in turn moves said demand dial to cause said first-mentioned gear and said teeth to mesh.

12. In a maximum demand meter, a rotatably supported demand dial, a dog for rotating said demand dial from its normal position, means for rotating said dog, means for simultaneously rendering said means inoperative and resetting said dog independently of said demand dial, and means for resetting said demand dial back to its normal position after it has been advanced by said dog, said means for resetting said demand dial, comprising a transmission mechanism connected to said motor and including a gear adapted to mesh with teeth on said demand dial and said gear and said teeth being normally out of mesh, and means for moving said demand dial so that said teeth thereon will mesh with the gear of said transmission system to move said dial back to its normal position.

MORRIS WEISMAN.